United States Patent
Park et al.

(10) Patent No.: US 8,848,914 B2
(45) Date of Patent: Sep. 30, 2014

(54) SPECTRUM AUTHORIZATION AND RELATED COMMUNICATIONS METHODS AND APPARATUS

(75) Inventors: Vincent D. Park, Budd Lake, NJ (US); Thomas Richardson, South Orange, NJ (US); Michaela Vanderveen, Tracy, CA (US); Junyi Li, Chester, NJ (US); M. Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/272,988

(22) Filed: Nov. 18, 2008

(65) Prior Publication Data
US 2010/0124331 A1 May 20, 2010

(51) Int. Cl.
| | |
|---|---|
| G06F 21/10 | (2013.01) |
| H04L 29/06 | (2006.01) |
| H04L 29/08 | (2006.01) |
| H04N 21/63 | (2011.01) |
| H04L 9/00 | (2006.01) |
| H04B 1/707 | (2011.01) |
| H04K 1/00 | (2006.01) |
| H04N 21/835 | (2011.01) |

(52) U.S. Cl.
CPC ............ *H04L 63/0428* (2013.01); *G06F 21/10* (2013.01); *H04L 29/08306* (2013.01); *H04L 63/062* (2013.01); *H04N 21/63* (2013.01); *G06F 21/105* (2013.01); *H04L 9/00* (2013.01); *H04L 63/162* (2013.01); *H04B 1/707* (2013.01); *H04K 1/00* (2013.01); *H04N 21/835* (2013.01); *H04L 69/24* (2013.01)
USPC ........................................................ 380/268

(58) Field of Classification Search
CPC ........... H04L 9/00; H04N 21/63; G06F 21/10
USPC ........................................................ 380/268
See application file for complete search history.

(56) References Cited

U.S. PATENT DOCUMENTS

| | | | | | |
|---|---|---|---|---|---|
| 4,211,891 | A | * | 7/1980 | Glitz | 380/262 |
| 5,042,050 | A | * | 8/1991 | Owen | 375/140 |

(Continued)

FOREIGN PATENT DOCUMENTS

| | | |
|---|---|---|
| JP | 2001148729 A | 5/2001 |
| JP | 2008206124 A | 9/2008 |

(Continued)

OTHER PUBLICATIONS

Hartung et al., "Spread Spectrum Watermarking Malicious Attacks and Counterattacks", 1999.*

(Continued)

*Primary Examiner* — O. C. Vostal
(74) *Attorney, Agent, or Firm* — James K. O'Hare

(57) ABSTRACT

Various embodiments relate to wireless communications, and more particularly, to methods and apparatus for authorizing use of spectrum, e.g., through the issuance of spectrum access keys, and/or preventing or discouraging the unauthorized use of licensed spectrum. Peer to peer wireless communications between authorized users of licensed spectrum may involve scrambling/descrambling of information communicated between authorized devices. In some embodiments air interface timing and/or other information received from a second device, e.g., a beacon or GPS transmitter, is incorporated into a computation of a pseudo-random bit sequence which is also computed based on a spectrum access key communicated to authorized spectrum users. In some embodiments authorized peer to peer devices scramble communicated information based on the generated pseudo random bit sequence thereby preventing or discouraging communication with devices which are not authorized to use the spectrum and lack a spectrum access key used to generate the pseudo random bit sequence.

18 Claims, 5 Drawing Sheets

(56) References Cited

U.S. PATENT DOCUMENTS

| | | | |
|---|---|---|---|
| 5,060,266 A * | 10/1991 | Dent | 380/274 |
| 5,148,485 A * | 9/1992 | Dent | 380/46 |
| 5,241,598 A * | 8/1993 | Raith | 380/248 |
| 5,442,646 A * | 8/1995 | Chadwick et al. | 714/795 |
| 5,511,090 A * | 4/1996 | Denton et al. | 370/342 |
| 5,668,880 A * | 9/1997 | Alajajian | 370/342 |
| 5,751,246 A * | 5/1998 | Hertel | 342/357.31 |
| 5,805,992 A * | 9/1998 | Schellinger | 455/411 |
| 5,812,955 A * | 9/1998 | Dent et al. | 455/561 |
| 5,963,646 A * | 10/1999 | Fielder et al. | 380/259 |
| 5,982,322 A * | 11/1999 | Bickley et al. | 342/357.59 |
| 6,069,954 A * | 5/2000 | Moreau | 380/28 |
| 6,215,876 B1 * | 4/2001 | Gilley | 380/260 |
| 6,222,924 B1 * | 4/2001 | Salomaki | 380/200 |
| 6,415,146 B1 * | 7/2002 | Capece | 455/517 |
| 6,490,317 B1 * | 12/2002 | Huscroft | 375/224 |
| 6,543,022 B1 * | 4/2003 | O'Connor | 714/752 |
| 6,754,251 B1 * | 6/2004 | Sriram et al. | 375/145 |
| 6,982,945 B1 * | 1/2006 | Gossett | 370/208 |
| 7,013,145 B1 * | 3/2006 | Centore, III | 455/454 |
| 7,167,463 B2 * | 1/2007 | Alapuranen | 370/338 |
| 7,492,807 B1 * | 2/2009 | Buchmann et al. | 375/130 |
| 7,574,731 B2 * | 8/2009 | Fascenda | 726/2 |
| 2001/0002487 A1 * | 5/2001 | Grawrock et al. | 713/193 |
| 2001/0036274 A1 * | 11/2001 | Antoine | 380/268 |
| 2002/0006197 A1 * | 1/2002 | Carroll et al. | 380/44 |
| 2002/0057802 A1 * | 5/2002 | Carlson et al. | 380/268 |
| 2002/0059614 A1 * | 5/2002 | Lipsanen et al. | 725/75 |
| 2003/0026323 A1 * | 2/2003 | Ozluturk | 375/130 |
| 2003/0093798 A1 * | 5/2003 | Rogerson | 725/75 |
| 2003/0133432 A1 * | 7/2003 | Moerder | 370/342 |
| 2003/0215211 A1 * | 11/2003 | Coffin, III | 386/46 |
| 2004/0006705 A1 | 1/2004 | Walker | |
| 2004/0203864 A1 * | 10/2004 | DiBuduo | 455/456.1 |
| 2004/0233973 A1 * | 11/2004 | Fullerton et al. | 375/130 |
| 2005/0058153 A1 * | 3/2005 | Santhoff et al. | 370/466 |
| 2005/0100165 A1 * | 5/2005 | Rose et al. | 380/270 |
| 2006/0209828 A1 * | 9/2006 | Ng et al. | 370/392 |
| 2006/0291506 A1 * | 12/2006 | Cain | 370/486 |
| 2007/0014536 A1 * | 1/2007 | Hellman | 386/94 |
| 2007/0026868 A1 * | 2/2007 | Schulz et al. | 455/454 |
| 2007/0112948 A1 * | 5/2007 | Uhlik | 709/223 |
| 2007/0197237 A1 * | 8/2007 | Powell et al. | 455/466 |
| 2007/0206641 A1 | 9/2007 | Egan | |
| 2007/0253468 A1 * | 11/2007 | Pettersen et al. | 375/146 |
| 2008/0095255 A1 * | 4/2008 | Tanaka et al. | 375/260 |
| 2008/0112334 A1 * | 5/2008 | Laroia et al. | 370/254 |
| 2008/0159416 A1 * | 7/2008 | Melick et al. | 375/259 |
| 2008/0178273 A1 * | 7/2008 | Weber | 726/7 |
| 2008/0208943 A1 * | 8/2008 | Haneda et al. | 708/400 |
| 2008/0239938 A1 * | 10/2008 | Jalloul et al. | 370/201 |
| 2008/0244148 A1 * | 10/2008 | Nix et al. | 710/313 |
| 2008/0252496 A1 * | 10/2008 | Aubin | 341/61 |
| 2009/0116407 A1 | 5/2009 | Ishii | |
| 2009/0214036 A1 * | 8/2009 | Shen et al. | 380/270 |
| 2009/0299836 A1 * | 12/2009 | Sachs et al. | 705/14.4 |
| 2010/0070760 A1 * | 3/2010 | Vanderveen et al. | 713/156 |
| 2010/0105400 A1 * | 4/2010 | Palmer | 455/450 |
| 2010/0177900 A1 * | 7/2010 | Hahn | 380/277 |
| 2011/0009145 A1 * | 1/2011 | Pirinen | 455/509 |
| 2011/0239296 A1 * | 9/2011 | Schipper | 726/22 |
| 2011/0280285 A1 * | 11/2011 | Kim et al. | 375/146 |
| 2013/0121398 A1 * | 5/2013 | Eliezer | 375/238 |

FOREIGN PATENT DOCUMENTS

| | | |
|---|---|---|
| JP | 2008227846 A | 9/2008 |
| WO | WO 9749200 A1 * | 12/1997 |
| WO | WO20070146364 | 12/2007 |

OTHER PUBLICATIONS

Chen et al., "A symmetric image encryption scheme based on 3D chaotic cat maps", 2003.*

Dong et al., "Data Hiding Via Phase Manipulation of Audio Signals", 2004.*

Lancini et al., "Embedding Indexing Information in Audio Signal Using Watermarking Technique", 2002.*

Auer et al., "Interference Aware Medium Access for Dynamic Spectrum Sharing", 2007.*

Lehr et al., "Managing Shared Access to a Spectrum Commons", 2005.*

Buddhikot et al., "DIMSUMNet: New Directions in Wireless Networking Using Coordinated Dynamic Spectrum Access", 2005.*

Di Pietro R, et al., "Random Key-Assignment for Secure Wireless Sensor Networks" Proceedings of the 1ST ACM Workshop Security of Ad Hoc and Sensor Networks, 2003, pp. 62-71, XP002595573.

International Search Report and Written Opinion—PCT/US2009/064405, International Search Authority—European Patent Office—Aug. 19, 2010.

Taiwan Search Report—TW098139162—TIPO—Jan. 31, 2013.

* cited by examiner

SPECTRUM AUTHORIZATION AND RELATED COMMUNICATIONS METHODS AND APPARATUS

FIELD

Various embodiments relate to wireless communications, and more particularly, to methods and apparatus for authorizing use of spectrum and/or preventing or discouraging the unauthorized use of spectrum, e.g., licensed spectrum.

BACKGROUND

Peer to peer devices in a communications system communicate using spectrum resources, e.g., licensed spectrum, provided by a spectrum owner. In the absence of a centralized controller such as an access point controlling the scheduling of transmission and the corresponding allocation of communications resources, e.g., on a time slot to time slot basis, it is difficult to control access and use of spectrum resources. For example, in peer to peer communications systems where individual devices can make decisions on whether or not to use communications resources, it can be difficult to control the unauthorized use of communications resources by unauthorized devices. The devices operating in the peer to peer communications system may include both the subscribed and legitimate communications devices that have subscribed for the services in the peer to peer communications system, as well as other devices which have no such subscription to services and thus are not authorized to use the spectrum. While it is important that a legitimate communications device operating in the peer to peer communications system be allowed access and usage of the spectrum, there is also a need for mechanism that can prevent or discourage the use of licensed spectrum by unauthorized communications devices without a service subscription.

Based on the above discussion, it should be appreciated that there is a need for methods and apparatus for authorizing use of spectrum, and/or preventing or discouraging the unauthorized use of spectrum.

SUMMARY

Various embodiments relate to wireless communications, and more particularly, to methods and apparatus for authorizing use of spectrum, and/or preventing or discouraging the unauthorized use of spectrum, e.g., licensed spectrum. Authorization to use spectrum is given, in some embodiments, through the issuance of a spectrum access key. In some embodiments, authorized communications devices, e.g., peer to peer wireless communications authorized to use licensed spectrum are provided with a spectrum access key in a secure manner. The authorized communications devices generate a pseudo-random sequence based on a spectrum access key and use the generated pseudo-random sequence to communicate. In some embodiments use of the pseudo-random access key may involve scrambling/descrambling information being communicated between the authorized devices over an airlink. Thus, in some but not necessarily all embodiments communication between authorized devices of licensed spectrum may involve scrambling/descrambling of information based on a pseudo-random bit sequence generated from the spectrum access key.

In order to provide a degree of increased security over embodiments where the pseudo-random sequence remains constant over long periods of time, in some embodiments air interface timing and/or other information received from a second device, e.g., a beacon or GPS transmitter, is used as a second input, in addition to the spectrum access key, when generating the pseudo-random bit sequence. In this manner, the pseudo-random sequence may be time varying and depend on one or more signals received from a second device which can be received by the various authorized devices seeking to communicate in a particular region.

Since authorized devices secure, e.g., scramble or encrypt, communications based on the spectrum access key and, optionally another signal, the ability of unauthorized devices to communicate with licensed devices and thus use the spectrum is prevented or discouraged since the unauthorized devices will lack the spectrum access key used to secure and recover, e.g., descramble or decrypt, communicated information.

Some exemplary embodiments are described in the context of a peer to peer system but the methods described herein are well suited for use with a variety of wireless communications systems, e.g., systems in which one device may detect signals transmitted by another device. Accordingly, it should be appreciated that the described methods are not limited to peer to peer systems.

In accordance with one exemplary aspect, an exemplary method of operating a first communications device includes receiving a first spectrum access key, receiving a first signal from a second communications device, generating a first pseudo-random bit sequence based on the first spectrum access key and based on the first signal from the second communications device, and using the generated first pseudo-random bit sequence to communicate over an air link with a third communications device.

In some but not necessarily all embodiments the spectrum access key is received by the first communications device in an encrypted form. In some such embodiments the method further includes decrypting the received spectrum access key prior to using the spectrum access key to generate said pseudo-random bit sequence.

In accordance with one but not necessarily all aspects, a first communications device includes at least one processor configured to: receive a first spectrum access key; receive a first signal from a second communications device; generate a first pseudo-random bit sequence based on the received first spectrum access key and the first signal from the second communications device; and use the generated first pseudo-random bit sequence to communicate over an airlink with a third communications device. The first communications device may, and in some embodiments does, include a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
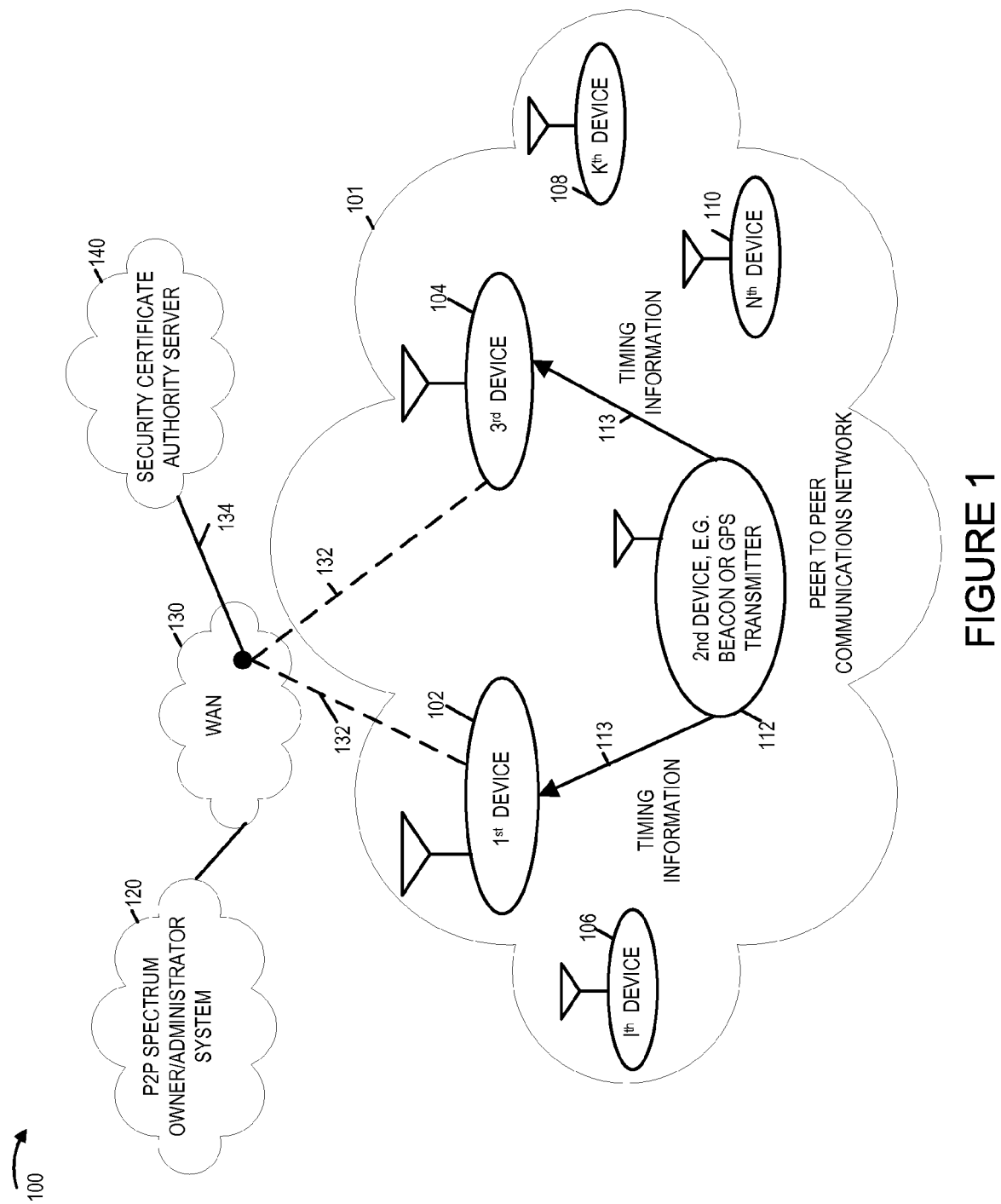
FIG. 1 illustrates an exemplary system including a peer to peer communications network, a wide area network and a security certificate authority, e.g., server, in accordance with an exemplary embodiment.

FIG. 1 illustrates an exemplary system 100 including a peer to peer communications (P2P) network 101, a P2P spectrum owner/administrator system 120, a wide area network 130, and a security certificate authority server 140, e.g., an authentication and authorization server, in accordance with an exemplary embodiment. In the illustrated embodiment the security certificate server 140 is part of the P2P network 101. While shown as outside the P2P network 101, the owner/administrative system 120 may also be part of the P2P network 101. Exemplary peer to peer communications network 101 includes a plurality of communications devices, e.g., peer to peer communications devices in addition to other communications devices such as the $2^{nd}$ device 112. The plurality of peer to peer communications devices include $1^{st}$, $3^{rd}$, $1^{th}$, $K^{th}$ and $N^{th}$ peer to peer communications devices 102, 104, 106, 108 and 110, respectively. The $2^{nd}$ device 112 may be a peer to peer device or a non-peer to peer communications device which transmits, e.g., a signal which can be detected by the peer to peer communications devices. For example, the $2^{nd}$ device may be a beacon transmitter, time synchronization transmitter or GPS (Global Positioning System) transmitter. The $2^{nd}$ device 112 broadcasts a signal such as an air interface timing signal and/or other synchronization signal as represented by arrow 113, which can be detected by communications devices in the P2P network 101. As will be discussed in the sections that follow, the communications devices in the network 101 may use the signal 113 from the $2^{nd}$ device 112, to generate a pseudo-random bit sequence which may be used in communicating with other authentic devices in the network 101. As will be discussed below, the 1st and 3rd peer to peer communications devices 102, 104 may transmit, e.g., broadcast signals, establish a connection and communicate using the spectrum available in the peer to peer communications network. In some embodiments such as the one shown in FIG. 1, the peer to peer communications network 101 is implemented without the use of a central controller, e.g., a controller which controls allocation of resources to devices for the transmission of signals as might be the case where a base station is used to control the scheduling of transmission by individual wireless terminals. While a central controller is not used, a security certification authority 140 generates and distributes certificates that allow legitimate devices and their associated users, to communicate with one another while making it difficult for unauthorized devices to interpret signals from and/or to communicate with the authorized devices.

In some embodiments, the P2P spectrum owner/administrator system 120 corresponds to the owner and/or provider of the available airlink communications resources, e.g., the wireless spectrum owner. The wide area network 130 may be, for example, a local access provider of internet services, serving the local region that includes the communications network 101. The security certification authority server 140 may be, e.g., a server that authenticates and authorizes legitimate communications devices operating in the communications network 101 who are entitled to access and use the P2P communications resources, e.g., spectrum. Following such an authentication, the security certification authority 140 may allow access of the spectrum to the communications devices for communicating. In some embodiments, the certification authority 140 and P2P spectrum owner/administrator 120 may be implemented as a single entity.

In accordance with one exemplary embodiment, communications devices, e.g., $1^{st}$ communications device 102 and the $3^{rd}$ communications device 104 in the network 101, which seek to communicate with each other using the P2P spectrum, may need to be authenticated and authorized prior to the establishment of a communications session between the two devices. This can be important since it is desirable that access to communications resources be restricted to legitimate subscriber devices which are affiliated with the service provider and/or spectrum owner. Authentication and authorization may be performed between a device seeking a certificate, e.g., spectrum access key, from the security certificate authority server 140 to support P2P communications and the security certificate authority server 140 in a number of ways. For example, P2P signals and/or communication via WAN 130 may be used for authentication and authorization purposes. In accordance with one exemplary embodiment, the signaling exchange, e.g., for an authentication and authorization process, between the subscriber device, e.g., $1^{st}$ communications device 102, is transported through the WAN 130. Thus, the subscriber devices and the security certificate authority 140 may exchange signaling, e.g., as shown by connectors 132 and 134, via another network, e.g., Internet. This can add a degree of security as opposed to using P2P signaling since the WAN acts as an out of band signaling path which is not easily monitored by other P2P devices.

Following the authentication and authorization process, which may be implemented using known techniques, e.g., challenge and response methods, the certification authority assuming successful authentication and authorization, will grant a spectrum access key to the authenticated subscriber device. In some embodiments, the spectrum access key may be communicated in encrypted form and the subscriber device, e.g., 1st communications device 102, decrypts the key prior to use. In some embodiments the subscriber device may need to perform further processing before using the spectrum access key to access the available spectrum for communicating with other devices. In accordance with an exemplary embodiment, one or more of the authenticated subscriber devices may communicate with one another using the spectrum access key. For example, the spectrum access key may be used to scramble communications. Non-legitimate devices, e.g., devices lacking a valid spectrum access key will be unable to interpret and communicate with devices using a legitimate spectrum access key thereby denying the non-authorized devices to take advantage of spectrum and interact with legitimate, e.g., authorized and authenticated devices.

Figure 2:
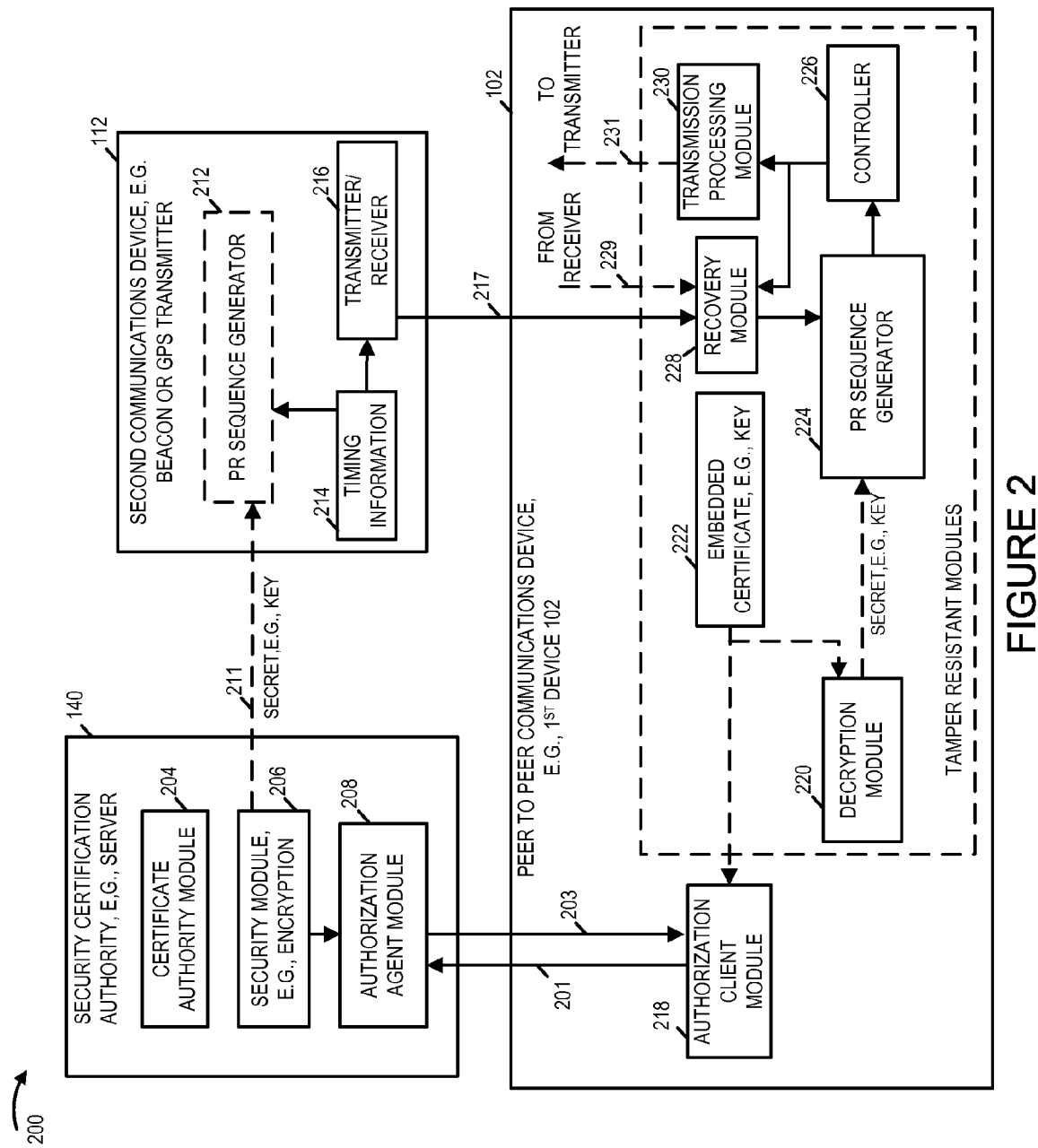
FIG. 2 is a more detailed illustration of the first and second communications devices, and the security certificate authority in the system of FIG. 1 showing various elements and the signaling exchange between the devices in greater detail.

FIG. 2 is a drawing 200 of the $1^{st}$ and $2^{nd}$ communications devices 102, 112 as well as the security certificate authority server 140 featured in the system of FIG. 1 showing the various elements and signaling exchange between the devices in greater detail. It should be appreciated that in some embodiments, any of the peer to peer communications devices in network 101 (e.g., 104, 106, 108 and 110) may be implemented as the $1^{st}$ communications device 102, and thus may include the same or similar elements and/or modules as shown in FIG. 2 and discussed below. The functions performed by an element/module of the $1^{st}$ device 102 may be performed by a similar or identical element/module in any of the other communications devices 104, 106, 108 and 110. As shown in FIG. 2, the peer to peer communications device 102 includes an authorization client module 218 and a plurality of tamper resistant modules as shown enclosed in a dashed box. The tamper resistant modules include a decryption module 220, an embedded certificate module 222, a pseudo-random bit sequence generator 224, a controller 226, a recovery module 228 and a transmission processing module 230. It should be appreciated that the tamper resistant modules may, and sometimes are designed so that no manipulation and/or tampering may be done to these modules without being detected, thereby providing an additional level of security. Tamper resistant modules may be coated with epoxy or other materials. Thus, an attempt to tamper the tamper resistant modules may, and normally will render the communications device 102 ineffective and non functional.

The security certification authority server 140 performs various functions discussed earlier in the example of FIG. 1 and includes a certificate authority module 204, a security module 206 and an authorization module 208. The $2^{nd}$ communications device 112, e.g., the beacon transmitter, includes a timing information module 214 and a transmitter/receiver module 216. In some embodiments, the $2^{nd}$ communications device 112 also includes a pseudo-random (PR) bit sequence generator 212.

In accordance with an exemplary embodiment, the peer to peer communications device 102, prior to gaining access of the spectrum to communicate with other peer devices in the network 101, exchanges signaling with the security certification authority server 140 as part of an authentication process. The signaling exchange is shown using arrows 201 and 203. The authorization client module 218 is the interactive module responsible for interacting with the authorization agent module 208 in the certification authority server 140 during the authentication and/or authorization process which may precede issuance or distribution of a spectrum access key. In some embodiments, the authorization client module 218 participates in a challenge-response process during the authentication stage of communications with server 140. For example, in some embodiments, the authorization agent module 208 in the certification authority server 140 challenges device 102 with the response to the challenge being used to verify the identity of the first communications device 102. In response to a challenge, the authorization client module 218 generates a response and sends the response including optionally, identification information corresponding to the first device 102, to the certification authority server 140. The certificate authority module 204 will verify the identity and authenticate the first device 102 assuming that the received response matches an expected response from the first device 102. In some embodiments, the certificate authority module 204 may authenticate the first device 102 by comparing the received response information with the expected response generated from a shared secret known to the 1st device 102 and the security server 140. A database of shared secrets and corresponding identification information may or may not be part of the certification authority server 140. Additionally, in other embodiments, the authentication process involves public/private key pairs rather than shared secrets. To this end, for example, in some but not all embodiments, the authorization agent module 208 in the certification authority server 140 requires the device 102 to present its Embedded Certificate 222 and prove possession of the private key associated with the public key in said certificate using public/private key protocols and algorithms known in the art.

Following the authentication process, the certificate authority module 204 provides a secure spectrum access key, e.g., in a secure form, to the authenticated and authorized device. In some embodiments, a spectrum access key is generated and then subjected to an encryption operation performed by the security module 206. In some embodiments, the security module 206 encrypts the spectrum access key using a public key corresponding to a private key, e.g., a secret known to the first communications device 102 but not others. In other embodiments, the spectrum access key is encrypted based on a shared secret known to both the security server 140 and the first communications device 102. Since the encryption is specific to device 102, communications of the secured, e.g., encrypted, spectrum access key may be over a public network while maintaining a reasonable level of security. The encrypted spectrum access key is communicated to the first communications device 102. Note that the spectrum access key, may be, the same or similar for one or more subscribed devices. Rather than using encryption to secure the spectrum access key, the spectrum access key may be secured through the use of a secure communications method, such as a memory chip or secure communications channel in which case security is provided by the delivery mechanism. In some embodiments, the encrypted spectrum access key may be communicated to the $2^{nd}$ device 112, as shown by arrow 211. In some such embodiments, the $2^{nd}$ device 112 may use the received spectrum access key in combination with the timing information generated by module 214 to generate a pseudo-random bit sequence. The pseudo-random bit sequence is generated by the pseudo-random bit sequence generator 212.

As discussed earlier, the $2^{nd}$ device 112 broadcasts a signal 217, such as an air interface timing signal and/or other synchronization signal using the transmitter/receiver module 216, to one or more devices in the communications network 101 including device 102. The signal 217 is processed and recovered by the recovery module 228. The output from the recovery module 228 which is, e.g., received timing information, is fed as an input to the pseudo-random sequence generator 224. The decryption module 220 is responsible for processing and decrypting the received encrypted spectrum access key. In some embodiments, the decryption module 220 decrypts the received spectrum access key using the embedded certificate 222 which may be, e.g., a private key or a shared secret. After decrypting the received spectrum access key, the decryption module 220 provides the spectrum access key as a second input to the pseudo-random sequence generator 224. The pseudo-random sequence generator 224, using the timing information received as an input from recovery module 228 and the spectrum access key, e.g., from the decryption module 220, generates a pseudo-random bit sequence. It should be appreciated that such a pseudo-random bit sequence will be generated by authentic and legitimate subscriber devices, e.g., devices having a valid spectrum access key but not other devices. In cases where the spectrum access key is secured via the delivery mechanism rather than encryption, the encryption and the corresponding decryption process can be skipped.

Following the generation of the pseudo-random bit sequence, the controller 226 selectively provides the generated pseudo-random bit sequence to the recovery module 228 and/or the transmission processing module 230. In some embodiments, the transmission processing module generates a communications signal including symbol values based on the generated pseudo-random bit sequence. The communications signal generated using pseudo-random bit sequence is then supplied to a transmitter as shown using arrow 231, for transmission to another device, e.g., a third communications device 104, with which communications device 102 seeks to communicate.

In some embodiments the communications device 102 receives a communications signal, e.g., a communications signal generated by the third device 104 based on, e.g., scrambled using, a pseudo-random bit sequence generated by the third device 104 sending the communications signal. In such an event, the received communications signal, e.g., as shown using arrow 229, is processed by the recovery module 228. In some embodiments, the recovery module is configured to recover the communicated symbol values from the received communications signal based on the pseudo-random bit sequence. Once again, as discussed earlier, a legitimate communications device which had been authorized and provided a spectrum access key should be able to make\sense out of the communicated signal and recover the communicated symbol value, while an un-authorized device will be unable to recover meaningful information from the received communications signal as a result of the scrambling, thus discouraging use of licensed spectrum by the un-authorized device without subscription. By basing the scrambling on both the spectrum access key and a locally available time varying signal, the chance of the scrambling being broken (e.g., recovered by a third party without access to the spectrum key) is diminished as compared to if a key alone was used, since the scrambling will vary with time.

Figure 3:
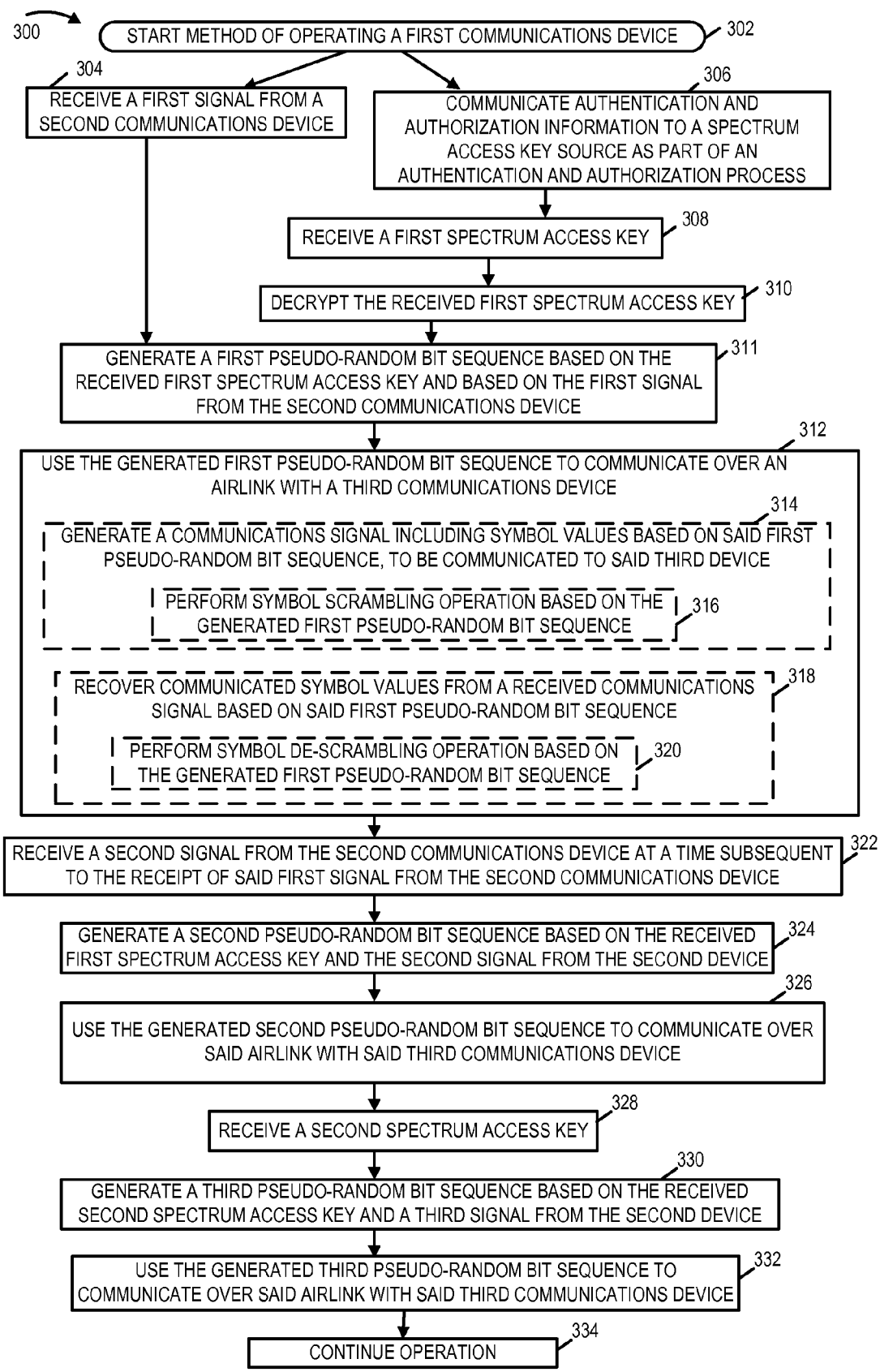
FIG. 3 is a flowchart showing the steps of an exemplary method of operating a communications device, e.g., a device receiving, processing and using the spectrum access key and timing information to communicate with other peer devices, in accordance with one exemplary embodiment.
Figure 4:
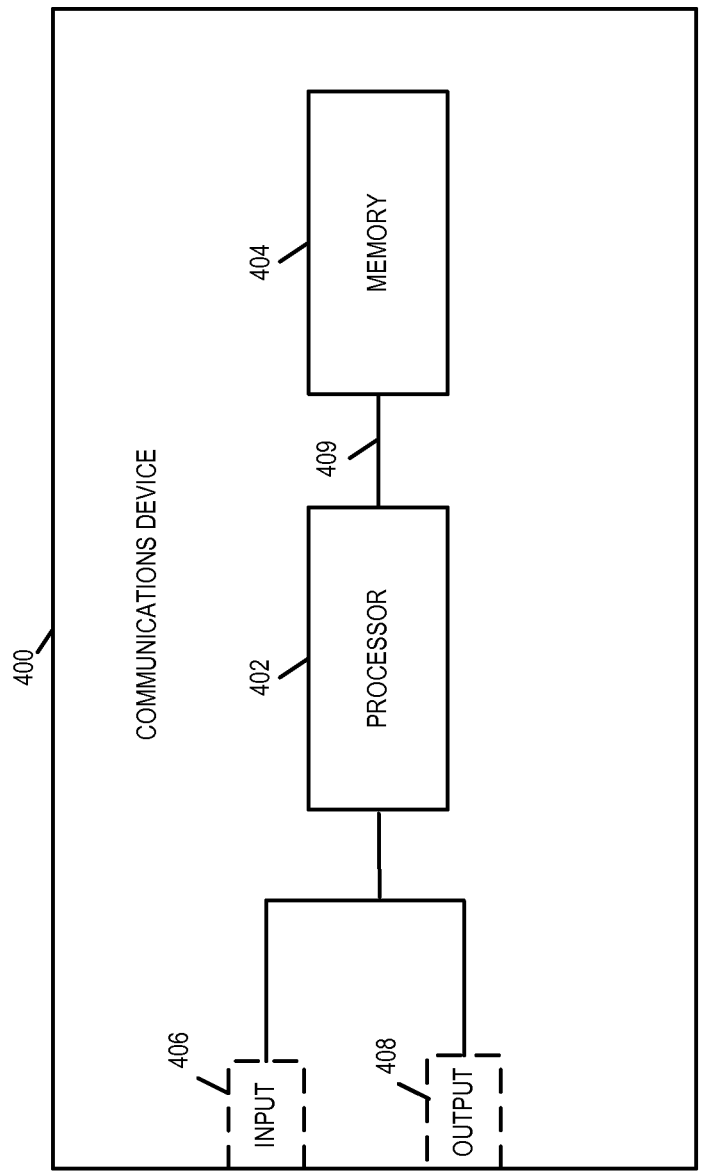
FIG. 4 shows an exemplary communications device which can be used in the system of FIG. 1.

While an exemplary embodiment has been used to describe various features, the method used in some embodiments will become even clearer when considered in view of the flow charts shown in FIGS. 3 and 4.

FIG. 3 is a flowchart 300 showing the steps of an exemplary method of operating a first communications device, e.g., a device receiving, processing and using the spectrum access key and timing information, to communicate with another peer device, e.g., in the network 101, in accordance with an exemplary embodiment. The first communications device can be, e.g., the $1^{st}$ peer to peer communications device 102 shown in FIGS. 1 and 2.

Operation starts in step 302 where the first communications device 102 is powered on and initialized. The operation proceeds from start step 302 to steps 304 and 306 which may, but need not be, performed in parallel. In some other embodiments, steps 304 and 306 are performed one after the other.

In step 304 the first communications device 102 receives a first signal, e.g., signal 113, from a second device, e.g., $2^{nd}$ device 112 of FIG. 2. As discussed earlier the received signal 113 may be, e.g., an air interface timing signal and/or other synchronization signal. In some embodiments, the second (2nd) communications device 112 is a beacon transmitter. In some embodiments, the received first signal from the second device is a broadcast timing signal. The operation proceeds from step 304 to step 311. Returning to step 306, in step 306 the first communications device 102 communicates authentication and authorization information to a spectrum access key source, e.g., the security certification authority 140 of FIG. 2, as part of an authentication and authorization process. It should be appreciated that the security certification authority server 140 may reside outside the peer to peer network 101, and the signaling exchange between the first communications device 102 and the security certification authority server 140 may be outside the P2P network, e.g., over another network such as a WAN local access provider. This has been discussed in detail in the example of FIG. 2 where the first communications device 102 exchanges signaling with the security certification authority 140 during the authentications process. Following the authentication and authorization process, operation proceeds to step 308 wherein the first communications device 102 receives a first spectrum access key. In some embodiments, the first spectrum access key is received in an encrypted form. In some embodiments, the first spectrum access key is encrypted by the spectrum key source, e.g., the security certification authority server 140, prior to communication, using a public key corresponding to a private key known to the communications device 102 but not other devices. In other embodiments, a secret known to the server 140 and the first device 102 is used to encrypt the spectrum access key.

Operation proceeds from step 308 to step 310 wherein the communications device 102 performs a decrypting operation on the received encrypted first spectrum access key to recover the spectrum access key. Again, the process of decrypting the received first spectrum access key in the first communications device 102 which may be performed by, e.g., a decryption module 220 using the embedded certificate 222, e.g., private key or shared secret, has been discussed earlier. Operation proceeds from step 310 to step 311. In step 311, which occurs at some subsequent time to the time at which the first spectrum access key and the first signal from the second device 112 were communicated to the first communications device 102, the first communications device 102 generates a first pseudo-random bit sequence based on the received first spectrum access key and based on the received first timing signal from the second device 112. This may be done by using a pseudo-random number generator which accepts both the spectrum access key and first signal as inputs which are used in generating a pseudo-random bit sequence. The generated first pseudo-random bit sequence may be, e.g., a sequence of binary values. Operation proceeds from step 311 to step 312.

In step 312, the first communications device 102 use the generated first pseudo-random bit sequence to communicate over an airlink with a third communications device, e.g., 3rd device 104. The third communications device 104 is, for example, another P2P communications device which also has the first spectrum access key and which also received the first signal, e.g., signal 113, from the second communications device 112. For example, consider a scenario where the first communications device 102 seeks to communicate with the third device 104 using the licensed spectrum. We assume that both the communications devices are authorized and legitimate subscribers and have received the spectrum access key from the certification authority 140 as well as the timing signal from the second device 112. Under these circumstances, the communications devices 102, 101 may be able to communicate using the licensed spectrum. In some, but not necessarily all embodiments, step 312 includes sub-step 314 and/or sub-step 318. In some embodiments, for example where the first communications device 102 seeks to communicate traffic data, e.g., in the form of symbol values, to the third device 104, sub-step 314 may be performed. In sub-step 314, which is performed as part of using the generated pseudo-random bit sequence to communicate over an airlink with the third communications device, the first communications device 102 generates a communications signal including symbol values (e.g., traffic data) based on the first pseudo-random bit sequence, to be communicated to the third communications device 104. For example, the communications signal including symbol values to be communicated may be put in a certain format and/or coded using the first pseudo-random bit sequence (generated by the first communications device 102) such that an authorized receiving device, e.g., third device 104, that has the first spectrum access key and received the first timing signal 113 would be able to interpret the communicated signal in a meaningful manner but other devices would not be able to interpret the communicated data accurately. A device that lacks either of the two inputs to the pseudo-random sequence generator, e.g., the timing signal received from the second communications device 112 or the spectrum access key, may not be able to recover the traffic data from the communications signal. In some embodiments, performing sub-step 314 may also include performing an optional sub-step 316 wherein the first communications device 102 performs a symbol scrambling operation based on the generated pseudo-random sequence, as part of generating the communications signal. In such a case the generated pseudo-random sequence may control the order in which symbols are re-ordered as part of the symbol scrambling process. In some embodiments, performing symbol scrambling includes reordering of the symbols prior to transmission of the communications signal. Optional sub-step 314 dealt with the case where the pseudo-random sequence is used to support transmission while optional sub-step 318 addresses the case where data is received as part of a communications operation.

In some embodiments, for example where the third communications device 104 seeks to communicate traffic data, e.g., in the form of symbol values, to the first communications device 102, sub-step 318 may be performed. In step 318 the first communications device 102 processes a communications signal including symbol values received from said third communications device 104, to recover the communicated symbol values based on the generated first pseudo-random bit sequence. Since communications device 102 is a legitimate device which has both the first spectrum access key and has received the timing signal from the second device 112, the first device 102 is capable of recovering and correctly interpreting the communicated symbol values by, e.g., using the generated pseudo-random bit sequence. In some embodiments, for example where a symbol scrambling operation may have been performed while generating the communication signal communicated from the third device 104 to the first communications device 102, performing sub-step 318 may also include performing an optional sub-step 320. In sub-step 320 the first communications device 102 performs a symbol de-scrambling operation based on the generated pseudo-random sequence, as part of recovering the communicated symbol values from the received communications signal. In some embodiments, performing symbol de-scrambling includes reordering of the symbols recovered from the received communications signal to put them back in their original unscrambled order. Operation proceeds from step 312 (which may include sub-steps 314, 316, 318 and 320) to step 322.

In step 322, the first communications device 102 receives a second signal from the $2^{nd}$ device 112, e.g. a beacon transmitter, at a time, e.g., subsequent to the receipt of the first signal from the second device 112. Thus, in some embodiments the first communications device 102 may periodically or non-periodically receive signals from the $2^{nd}$ device 112, and this process may repeat at certain rate. The 2nd device 112 may broadcast the second signal to the communications devices in the network 101 and thus the second signal may also be received by other communications devices including the communications device 104. Thus, the various devices may receive an updated version of one of the inputs to the pseudo-random sequence generator as the signal transmitted by the second device 112 changes with time. The operation proceeds from step 322 to step 324 wherein the first communications device 102 generates a second pseudo-random bit sequence based on the received first spectrum access key and based on the second signal from the $2^{nd}$ communications device 112. The process of generating the second pseudo-random bit sequence is similar to the pseudo-random bit sequence generating process discussed earlier, however it should be appreciated that this time the inputs used for generating the second pseudo-random bit sequence are the second signal, e.g., current timing signal, received from the $2^{nd}$ device 112 and the received first spectrum access key. Thus the output will be different since the input, e.g., second signal, is different from the first signal from the second (2nd) device 112.

Operation proceeds from step 324 to step 326 wherein the first communications device 102 uses the generated second pseudo-random bit sequence to communicate over an airlink with the third communications device 104. The third communications device 104 also receives the second signal from the $2^{nd}$ device 112. The operation in step 326 is similar to what has been discussed with regard to step 312, with the exception that in step 326 the second pseudo-random bit sequence is used to communicate with the third (3rd) communications device 104. The operation proceeds from step 326 to step 328. In step 328 the first communications device 102 receives a second spectrum access key. The second spectrum access key which is received at a time, e.g., subsequent to the receipt of the first spectrum access key, may be received from the same source, e.g., the security certification authority server 140. In some embodiments, an authorized communications device, e.g., such as communications devices 102 and 104, may receive a spectrum access key, e.g., once every month or at some other time interval. It should be appreciated that new spectrum access keys are often received at a different, e.g., longer interval, than the interval between different signals from the second communications device 112. Operation proceeds from step 328 to step 330.

As mentioned earlier, the first communications device 102 may periodically or non-periodically receive signals from the $2^{nd}$ device 112. Thus in some embodiments, during the operation the communications device 102 receives a third signal from the second communications device. In step 330, the first communications device 102 generates a third pseudo-random bit sequence based on the received second spectrum access key and based on the third signal received from the second communications device, e.g., $2^{nd}$ device 112. The operation proceeds from step 330 to step 332 wherein the first communications device 102 is operated to use the generated third pseudo-random bit sequence to communicate with the third communications device 104, over the airlink. The operation may continue in this manner as indicated by step 334. As should be appreciated, the receipt and updating of the pseudo-random sequence used for scrambling may occur many times during a communications session.

FIG. 4 is a drawing of an exemplary communications device 400 in accordance with one exemplary embodiment. Communications device 400 maybe, and in at least one embodiment is, a mobile wireless terminal supporting peer to peer communications and implementing a method in accordance with flowchart 300 of FIG. 3. The communications device 400 may be used as the first communication device 102 of FIG. 1. Communications device 400 includes a processor 402 and memory 404 coupled together via a bus 409 over which the various elements (402, 404) may interchange data and information. Communications device 400 further includes an input module 406 and an output module 408 which may be coupled to the processor 402 as shown. However, in some embodiments the input module and output module 406, 408 are located internal to the processor 402. Input module 406 can receive input signals. Input module 406 can, and in some embodiments does, include a wireless receiver and/or a wired or optical input interface for receiving input. Output module 408 may include, and in some embodiments does include, a wireless transmitter and/or a wired or optical output interface for transmitting output. Processor 402, in some embodiments, is configured to: receive a first spectrum access key, receive a first signal from a second communications device, generate a first pseudo-random bit sequence based on the received first spectrum access key and based on the first signal from the second communications device, and use the generated first pseudo-random bit sequence to communicate over an airlink with a third (3rd) communications device which also has said first spectrum access key and which received said first signal from the second communications device.

In some embodiments, the first spectrum access key is received in an encrypted form. The processor 402 may and in some embodiments is, further configured to decrypt said received first spectrum access key prior to using the first spectrum access key to generate said first pseudo-random bit sequence. In some embodiments the processor 402 is further configured to communicate authentication and authorization information to a spectrum access key source as part of an authentication and authorization process, prior to receiving the first spectrum access key. In at least some embodiments, the first signal from a second communications device is a broadcast timing signal. In at least one embodiment, the second communications device is a beacon transmitter.

In some embodiments, the processor 402 is further configured to: generate a communication signal including symbol values to be communicated based on said first pseudo-random bit sequence, and perform a communicated symbol value recovery operation to recover communicated symbol values from a received communication signal, said recovery operation being based on the first pseudo-random bit sequence. In some embodiments, the processor 402 is further configured to perform a symbol scrambling operation based on said generated first pseudo-random bit sequence as part of generating a communications signal. In some embodiments, symbol scrambling includes reordering of symbols to generate said communications signal. In some embodiments, the processor 402 is further configured to perform a symbol de-scrambling operation based on said generated first pseudo-random bit sequence as part of recovering communicated symbol values from a received communications signal. In some such embodiments symbol de-scrambling includes reordering of symbols recovered from the received communications signal.

In some embodiments, the processor 402 is further configured to: receive a second signal from the second communications device at a time subsequent to receipt of said signal from the second communications device, generate a second pseudo-random bit sequence based on the received first spectrum access key and based on the second signal from the second communications device, and use the generated second pseudo-random bit sequence to communicate over said airlink with said third communications device which also receives said second signal from the second communications device.

In some embodiments, the processor 402 is further configured to: receive a second spectrum access key, generate a third pseudo-random bit sequence based on the received second spectrum access key and based on a third signal from the second communications device, and use the generated third pseudo-random bit sequence to communicate over said airlink with the third communications device.

Figure 5:
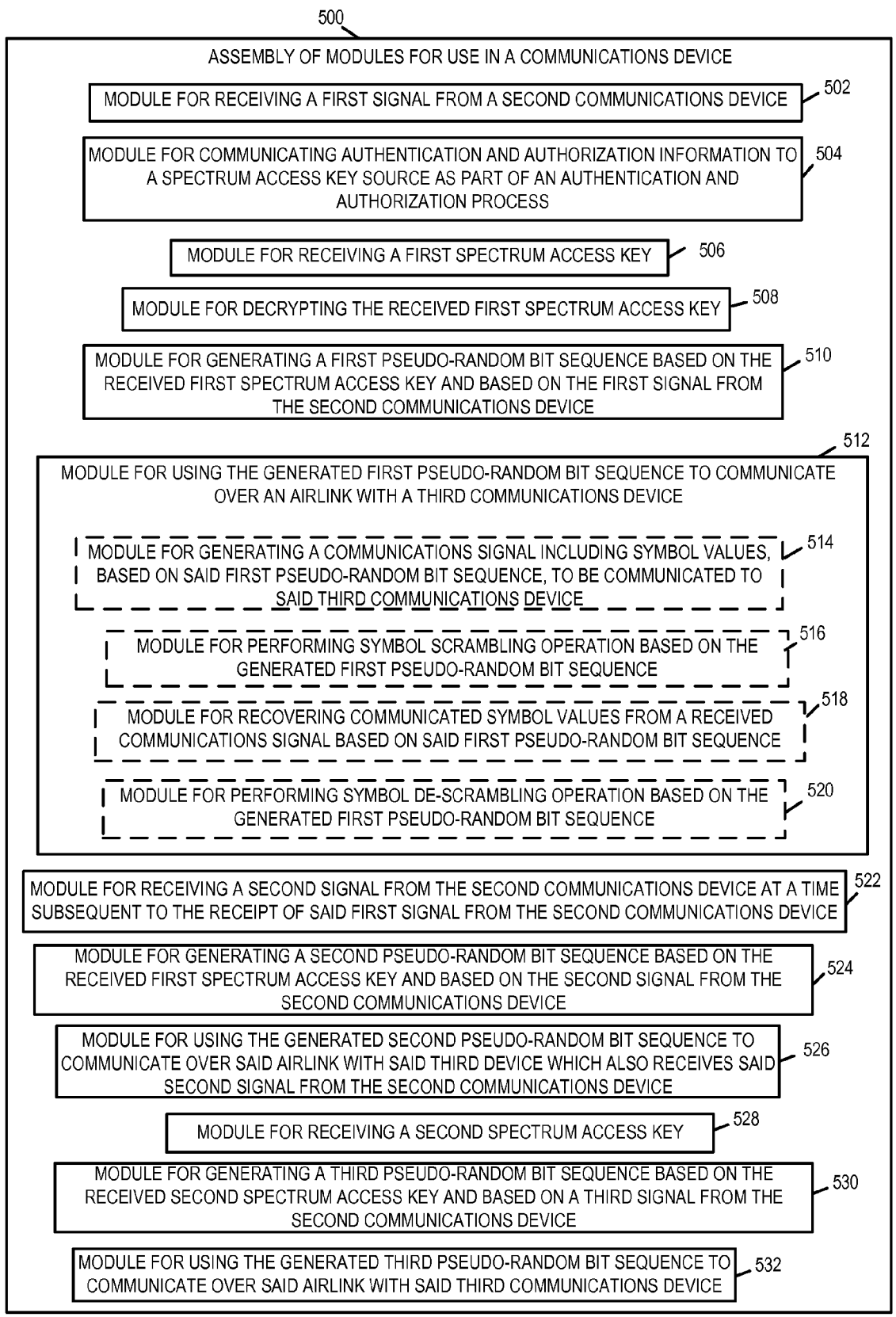
FIG. 5 illustrates an assembly of modules which can be used in the exemplary communications device of FIG. 4.

FIG. 5 is an assembly of modules 500 which can, and in some embodiments are, used in the communications device illustrated in FIG. 4. The modules in the assembly 500 can be implemented in hardware within the processor 402 of FIG. 4, e.g., as individual circuits. Alternatively, the modules may be implemented in software and stored in the memory 404 of the communications device 400 shown in FIG. 4. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the communications device 400 or elements therein such as the processor 402, to perform the functions of the corresponding steps illustrated in the method flow chart of FIG. 3.

As illustrated in FIG. 5, the assembly of modules 500 includes a module 502 for receiving a first signal from a second communications device, a module 504 for communicating authentication and authorization information to a spectrum access key source, e.g., authentication and authorization server, as part of an authentication and authorization process, a module 506 for receiving a first spectrum access key, a module 508 for decrypting said received first spectrum access, a module 510 for generating a first pseudo-random bit sequence based on the received first spectrum access key and based on the first signal from the second communications device, a module 512 for using the generated first pseudo-random bit sequence to communicate over an airlink with a third communications device which also has said first spectrum access key and which received said first signal from the second communications device. In some embodiments, the module 512 includes a module 514 for generating a communication signal including symbol values, based on the first pseudo-random bit sequence, to be communicated to the another communications device, a module 516 for performing symbol scrambling operation based on the generated first pseudo-random bit sequence, a module 518 for recovering communicated symbol values from a received communications signal based on the first pseudo-random bit sequence, and a module 520 for performing symbol de-scrambling operation based on the generated first pseudo-random bit sequence.

The assembly of modules 500 further includes a module 522 for receiving a second signal from the second communications device at a time subsequent to receipt of said first signal from the second communications device, a module 524 for generating a second pseudo-random bit sequence based on the received first spectrum access key and based on the second signal from the second communications device, a module 526 for using the generated second pseudo-random bit sequence to communicate over said airlink with the third device which also receives said second signal from the second communications device, a module 528 for receiving a second spectrum access key, a module 530 for generating a third pseudo-random bit sequence based on the received second spectrum access key and based on a third signal from the second communications device, and a module 532 for using the generated third pseudo-random bit sequence to communicate over the airlink with the third communications device.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations, communications devices and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Some embodiments are directed to a computer program product comprising a computer-readable medium, e.g., a physical medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The P2P spectrum may use orthogonal Frequency Division Multiplexing (OFDM) signals. However, it should be appreciated that at least some of the methods and apparatus of various embodiments are applicable to a wide range of communications systems including many non-OFDM and/or non-cellular systems such as CDMA systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In various embodiments the peer to peer communications devices are implemented as notebook computers, personal data assistants (PDAs), or other portable devices including receiver/transmitter circuits and logic and/or routines, for implementing the methods.

What is claimed is:

1. A method of operating a first peer communications device, the method comprising:
    communicating authentication and authorization information to a spectrum access key source as part of an authentication and authorization process;
    receiving a first spectrum access key from the spectrum access key source in response to the communicating the authentication and authorization information to the spectrum access key source, wherein the first spectrum access key provides access to a licensed frequency spectrum for peer-to-peer wireless communications;
    receiving a first signal from a second peer communications device, wherein the first signal comprises a broadcast timing signal generated by the second peer communications device;
    generating a first pseudo-random bit sequence based on the first spectrum access key and based on the received broadcast timing signal generated by the second peer communications device; and
    using the generated first pseudo-random bit sequence to communicate over a peer-to-peer air link with a third peer communications device that has also received the first spectrum access key from the spectrum access key source and the broadcast timing signal from the second peer communications device.

2. The method of claim 1,
    wherein said first spectrum access key is received in an encrypted form, the method further comprising:
        decrypting said received first spectrum access key prior to using the first spectrum access key to generate said first pseudo-random bit sequence.

3. The method of claim 2, wherein said second peer communications device is a beacon transmitter.

4. The method of claim 2, wherein using the generated first pseudo-random bit sequence includes at least one of generating a communication signal including symbol values to be communicated based on said first pseudo-random bit sequence and recovering communicated symbol values from a received communication signal based on said first pseudo-random bit sequence.

5. The method of claim 4, wherein using the generated first pseudo-random bit sequence includes performing a symbol scrambling operation based on said generated first pseudo-random bit sequence as part of generating a communications signal.

6. The method of claim 4, wherein using the generated first pseudo-random bit sequence includes performing a symbol de-scrambling operation based on said generated first pseudo-random bit sequence as part of recovering communicated symbol values from a received communications signal.

7. A first peer communications device comprising:
at least one processor configured to:
communicate authentication and authorization information to a spectrum access key source as part of an authentication and authorization process;
receive a first spectrum access key from the spectrum access key source in response to communicating the authentication and authorization information to the spectrum access key source, wherein the first spectrum access key provides access to a licensed frequency spectrum for peer-to-peer wireless communications;
receive a first signal from a second peer communications device, wherein the first signal comprises a broadcast timing signal generated by the second peer communications device;
generate a first pseudo-random bit sequence based on the received first spectrum access key and the received broadcast timing signal generated by the second peer communications device; and
use the generated first pseudo-random bit sequence to communicate over a peer-to-peer airlink with a third peer communications device that has also received the first spectrum access key from the spectrum access key source and the broadcast timing signal from the second peer communications device; and
a memory coupled to said at least one processor.

8. The first peer communications device of claim 7,
wherein said first spectrum access key is received in an encrypted form; and
wherein said at least one processor is further configured to decrypt said received first spectrum access key prior to using the first spectrum access key to generate said first pseudo-random bit sequence.

9. The first peer communications device of claim 8, wherein said second peer communications device is a beacon transmitter.

10. The first peer communications device of claim 8, wherein said at least one processor is further configured to:
generate a communication signal including symbol values to be communicated based on said first pseudo-random bit sequence; and
recover communicated symbol values from a received communication signal based on said first pseudo-random bit sequence.

11. The first peer communications device of claim 10, wherein said at least one processor is further configured to perform a symbol scrambling operation based on said generated first pseudo-random bit sequence as part of generating a communications signal.

12. The first peer communications device of claim 10, wherein said at least one processor is further configured to perform a symbol de-scrambling operation based on said generated first pseudo-random bit sequence as part of recovering communicated symbol values from a received communications signal.

13. A first peer communications device comprising:
means for communicating authentication and authorization information to the spectrum access key source as part of an authentication and authorization process;
means for receiving a first spectrum access key from the spectrum access key source in response to the communicating the authentication and authorization information to the spectrum access key source, wherein the first spectrum access key provides access to a licensed frequency spectrum for peer-to-peer wireless communications;
means for receiving a first signal from a second peer communications device, wherein the first signal comprises a broadcast timing signal generated by the second peer communications device;
means for generating a first pseudo-random bit sequence based on the received first spectrum access key and based on the received broadcast timing signal generated by the second peer communications device; and
means for communicating over a peer-to-peer airlink, using the generated first pseudo-random bit sequence, with a third peer communications device that has also received the first spectrum access key from the spectrum access key source and the broadcast timing signal from the second peer communications device.

14. The first peer communications device of claim 13,
wherein said first spectrum access key is received in an encrypted form, the first peer communications device further comprising:
means for decrypting said received first spectrum access key prior to using the first spectrum access key to generate said first pseudo-random bit sequence.

15. The first peer communications device of claim 14, further comprising:
means for generating a communication signal including symbol values to be communicated based on said first pseudo-random bit sequence; and
means for recovering communicated symbol values from a received communication signal based on said first pseudo-random bit sequence.

16. The first peer communications device of claim 15, further comprising:
means for performing a symbol scrambling operation based on said generated first pseudo-random bit sequence as part of generating a communications signal.

17. A computer program product for use in a first peer communications device, comprising:
a non-transitory computer readable medium comprising:
code for causing at least one computer to communicate authentication and authorization information to a spectrum access key source as part of an authentication and authorization process;
code for causing the at least one computer to receive a first spectrum access key from the spectrum access key source in response to communicating the authentication and authorization information to the spectrum access key source, wherein the first spectrum access key provides access to a licensed frequency spectrum for peer-to-peer wireless communications;
code for causing the at least one computer to receive a first signal from a second peer communications device, wherein the first signal comprises a broadcast timing signal generated by the second peer communications device;

code for causing the at least one computer to generate a first pseudo-random bit sequence based on the received first spectrum access key and based on the received broadcast timing signal generated by the second peer communications device; and code for causing the at least one computer to use the generated first pseudo-random bit sequence to communicate over a peer-to-peer airlink with another peer device that has also received the first spectrum access key from the spectrum access key source and the broadcast timing signal from the second peer communications device.

18. The computer program product of claim 17, wherein said first spectrum access key is received in an encrypted form; and wherein the computer readable medium further comprises:

code for causing the at least one computer to decrypt said received first spectrum access key prior to using the first spectrum access key to generate said first pseudo-random bit sequence.

\* \* \* \* \*